United States Patent [19]
Liu

[11] Patent Number: 6,128,414
[45] Date of Patent: Oct. 3, 2000

[54] NON-LINEAR IMAGE PROCESSING AND AUTOMATIC DISCRIMINATING METHOD AND APPARATUS FOR IMAGES SUCH AS IMAGES OF MACHINE-READABLE SYMBOLS

[75] Inventor: Lingnan Liu, Mill Creek, Wash.

[73] Assignee: Intermec IP Corporation, Beverly Hills, Calif.

[21] Appl. No.: 08/939,140

[22] Filed: Sep. 29, 1997

[51] Int. Cl.$^7$ .................................. G06K 9/40; G06K 7/10
[52] U.S. Cl. ................ 382/266; 235/462.07; 235/462.03
[58] Field of Search ....................... 235/462–4; 382/182, 382/257, 266, 267, 268

[56] References Cited

U.S. PATENT DOCUMENTS

| | | | |
|---|---|---|---|
| 4,874,936 | 10/1989 | Chandler et al. | 235/494 |
| 4,916,298 | 4/1990 | Raphaël | 235/463 |
| 4,998,010 | 3/1991 | Chandler et al. | 235/494 |
| 5,031,227 | 7/1991 | Raasch et al. | 382/22 |

(List continued on next page.)

OTHER PUBLICATIONS

Gonzalez, Rafael C. and Paul Wintz, *Digital Image Processing*, Addison–Wesley Publishing Company, Reading, Massachusetts, 1977, pp. 39–47.

Davies, E. R., *Machine Vision: Theory, Algorithms, Practicalities*, Academic Press, London, 1989, pp. 207–215 and 265–271.

Haralick et al., "Computer Vision Update," *The Handbook of Artificial Intelligence*, Barr et al. eds., vol. IV, Chapter XXIII, Addison–Wesley Publishing Company, 1989, pp. 519–585.

Pavlidis, Theo et al., "Information Encoding with Two–Dimensional Bar Codes," *Computer*, Jun., 1992, pp. 18–28.

Russ, John C., *The Image Processing Handbook*, CRC Press, Boca Raton, Florida, Nov., 1994, pp. 170–189.

Dougherty et al., *An Introduction to Nonlinear Image Processing*, vol. TT 16, Chapters 2 and 3, SPIE Optical Engineering Press, 1994, pp. 6–43.

*Primary Examiner*—Amelia Au
*Assistant Examiner*—Martin Miller
*Attorney, Agent, or Firm*—Perkins Coie LLP

[57] ABSTRACT

A method and apparatus for locating geometric shapes or edges thereof in data collection symbols initially samples and stores an image of light reflected from the symbol. Thereafter, two routines are performed. A first routine performs low level vision processing by identifying linked points along edges, lines, curves or within shapes. At least one of three distortion compensating subroutines compensate for blocking, breaking, gaps or other severe distortions affecting shapes in the stored image. Under a first subroutine, an edge of a shape is tracked until a stopping condition occurs, at which point the shape is crossed so as to continue tracking on an opposite edge. Under a second subroutine, previously collected linear curve information is used to identify a jump point to continue tracking following a stopping condition. Under a third subroutine, mathematical morphology techniques are employed to close gaps or move blockage in shapes in the stored image. Coordinates of linked points, which represent lines, curves and other geometric shapes, from the first routine are then employed by a second routine which identifies patterns within the identified lines/curves. Based on these identified patterns, types of symbols from various symbologies can be identified and located within the stored image.

39 Claims, 8 Drawing Sheets

U.S. PATENT DOCUMENTS

| | | | |
|---|---|---|---|
| 5,052,044 | 9/1991 | Gaborski | 382/32 |
| 5,073,955 | 12/1991 | Evers | 382/21 |
| 5,124,537 | 6/1992 | Chandler et al. | 235/462 |
| 5,155,343 | 10/1992 | Chandler et al. | 235/462 |
| 5,189,292 | 2/1993 | Batterman et al. | 235/494 |
| 5,233,670 | 8/1993 | Dufour et al. | 382/22 |
| 5,241,166 | 8/1993 | Chandler | 235/494 |
| 5,243,655 | 9/1993 | Wang | 380/51 |
| 5,276,315 | 1/1994 | Surka | 235/462 |
| 5,319,181 | 6/1994 | Shellhammer et al. | 235/462 |
| 5,324,923 | 6/1994 | Cymbalski et al. | 235/454 |
| 5,373,147 | 12/1994 | Noda | 235/462 |
| 5,376,780 | 12/1994 | Klueter | 235/462 |
| 5,393,968 | 2/1995 | Watanabe et al. | 235/462 |
| 5,418,862 | 5/1995 | Zheng et al. | 382/199 |
| 5,436,984 | 7/1995 | Sarkkinen et al. | 382/258 |
| 5,539,191 | 7/1996 | Ackley | 235/462 |
| 5,668,893 | 9/1997 | Kanda et al. | 382/197 |
| 5,719,967 | 2/1998 | Sekine | 382/266 |
| 5,739,518 | 4/1998 | Wang | 235/454 |
| 5,742,041 | 4/1998 | Liu | 235/462 |
| 5,748,804 | 5/1998 | Surka | 382/291 |
| 5,764,798 | 6/1998 | Liu | 382/190 |
| 5,781,667 | 7/1998 | Schmidt et al. | 382/308 |
| 5,786,583 | 7/1998 | Maltsev | 235/462 |
| 5,790,701 | 8/1998 | Shijo et al. | 382/205 |
| 5,811,776 | 9/1998 | Liu | 235/462 |
| 5,854,478 | 12/1998 | Liu et al. | 235/462 |
| 5,881,171 | 3/1999 | Kinjo | 382/199 |

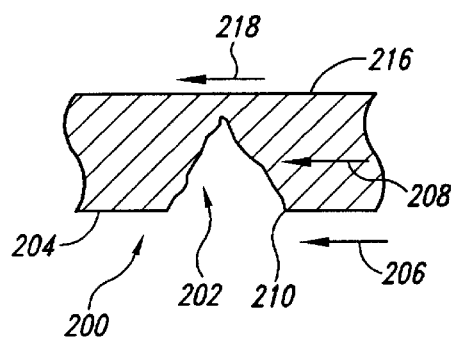 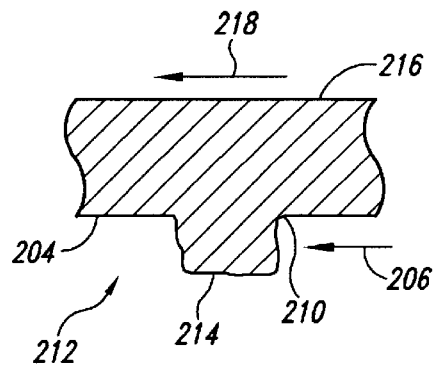
Fig. 5A                    Fig. 5B
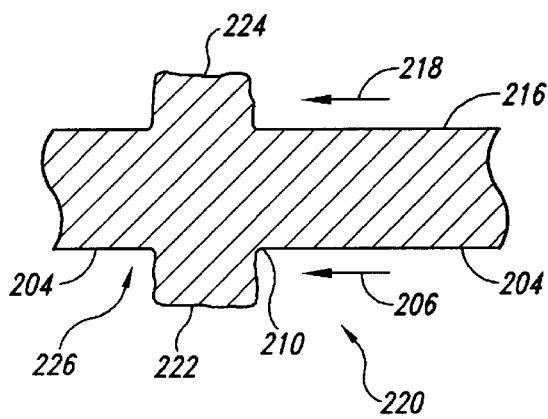 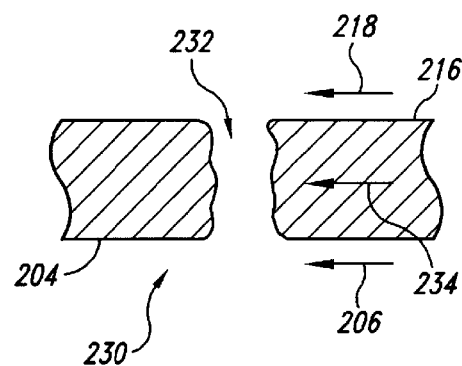
Fig. 7                      Fig. 9

NON-LINEAR IMAGE PROCESSING AND AUTOMATIC DISCRIMINATING METHOD AND APPARATUS FOR IMAGES SUCH AS IMAGES OF MACHINE-READABLE SYMBOLS

TECHNICAL FIELD

The present invention relates to a method and apparatus for processing images in machine vision systems.

BACKGROUND OF THE INVENTION

Bar code symbologies are widely used for data collection. The first bar code symbologies developed, such as U.P.C., EAN, Code 39 and Code 93 can be referred to as "linear" symbologies because data in a given symbol is decoded along one direction or axis. Linear symbologies generally encode data characters as parallel arrangements of multiple width rectangular bars and spaces. Each unique pattern of bars and spaces within a predetermined width defines a particular data character. A given linear symbol encodes several data characters along its length as several groups of unique bar and space patterns.

Such linear symbologies are typically decoded using laser scanners or wand-based readers. In general, bar code readers scan a symbol and sample the scan line or lines to get a one-dimensional signal waveform and/or a sequence of distances between the bars and spaces in the symbol, and then analyze the waveform or distances to deduce the data encoded in the symbol. Various methods of decoding linear symbologies exist, such as edge-to-edge (element pairs) decoding of individual elements in a symbol, bar-to-bar or space-to-space comparisons, Factor R, and other known decoding methods.

As data collection markets grew, greater amounts of data were required to be encoded within a smaller area (i.e., greater "information density"). To increase the information density in bar code symbologies, "multi-row" or "stacked" symbologies were developed such as Code 49 and PDF417. Stacked symbologies generally employ several adjacent rows, each row having several characters defined by groups of multiple width bars and spaces.

Difficulties arose in attempting to read and decode these stacked symbologies. For example, a typical laser scanner must be precisely aligned with each row in a stacked symbol for it to scan and properly decode the groups of bars and spaces in each row. If the laser scanner is skewed so that its beam scans across several rows, the resulting scan data cannot be accurately decoded. One known method, described in U.S. Pat. No. 5,243,655 (the '655 patent) allows a laser scanner to decode stacked bar code symbols, particularly PDF417 symbols. The scanner under the '655 patent, however, requires significant processing time. Additionally, the method of decoding a stacked bar code under the '655 patent is limited to use with a laser scanner.

As the result of such limitations of laser scanners, and to accommodate the increasing information-density in developing symbologies, area or two-dimensional readers were created, to read area symbologies such as Code One, MaxiCode and Data Matrix. "Area symbologies," as well as most stacked symbologies, are formed by a finder pattern and a set of encoded data enclosed or near the finder pattern.

Numerous known methods of locating and decoding stacked and area symbologies exist. Each method typically provides an optimal method of decoding a particular symbology, or symbologies in a particular environment. Thus, if a reader is to locate and decode several symbologies, the reader must include multiple locating and decoding methods. Since any stored image could have the image of a symbol from any of the symbologies, the reader must perform each method to ensure that all symbols in the stored image are located and decoded. However, typically due to limitations in processing power and the time required to implement such methods, only one of such methods is typically included in a given reader.

Furthermore, many locating and decoding methods can tolerate only limited symbol degradation. If a reader is to handle various types of damage to which a symbol may suffer, such as printing errors, optical distortions, etc., the reader must include even more methods for handling such situations. This requirement further adds to the complexity of the reader and slows the processing time to locate and decode symbol images within a stored image.

SUMMARY OF THE INVENTION

As described in the inventor's U.S. patent application Ser. No. 08/814,001, filed Mar. 10, 1997, the inventor has determined that finder patterns of existing stacked and area symbologies, as well as linear symbologies, are based on the simplest geometric structures, such as linear patterns or solid ring/circular patterns. Even if the finder pattern is damaged due to label damage, poor print quality, media surface reflection, blurring due to improper focusing, optical distortions, or other errors, the present invention can nevertheless reliably and accurately locate the finder pattern in stored images.

An embodiment of the invention in the inventor's above application locates images of symbols within a stored image under a basic two-step process. First, the embodiment finds low-level information, such as edges, lines, curves, and other basic geometric information. Secondly, the embodiment groups the gathered information together to interpret the symbol and identify a symbology from which the symbol was generated. As a result, the embodiment can be used as a general automatic symbol discrimination system for various symbologies.

Under this application, a method and apparatus for locating smoothed curves representing geometric shapes of the finder pattern thereof in data collection symbols initially samples and stores an image of light reflected from the symbol. Thereafter, two routines are performed. A first routine performs low level vision processing by identifying linked points along lines or curves or along boundaries or geometric characteristics representing a basic structure of the finder pattern. A rapid pixel linking subroutine identifies and groups edge pixels in symbol images lacking distortion. If the edge or shape suffers from distortions, then one or more distortion compensating subroutines locate sequential linked pixels despite such distortions. The combined sequential linking method robustly finds the geometric shape of finder patterns. The resulting coordinates of linked points, which represent lines, curves and other geometric shapes, are then employed by a second routine which identifies patterns within the identified lines/curves. Based on these identified patterns, types of symbols from various symbologies can be identified and located within the stored image.

The inventor's above application provides effective and efficient processing of symbol images and other stored images that suffer from minor distortions. However, at least one embodiment under the system of the application cannot handle severe distortions to the stored image of a symbol.

For example, partial or complete breaking or gaps formed in a bar, or blockage extending from opposite sides of a bar, may not be effectively handled by at least one embodiment of the system under the application.

Under an embodiment of the present invention, the inventor provides improved methods and apparatus for coping with stored images of symbols and other stored images suffering from severe distortions. Under at least one embodiment, the invention provides three techniques for attempting to compensate for blocking, breaking, or other severe distortions affecting the stored image of the symbol. Under a first technique, the embodiment tracks along an edge of a bar until a stopping condition occurs, at which point the bar is crossed so as to continue tracking on an opposite edge of the bar. In a second technique, previously collected line or curve information is used to identify a jump point to continue along a tracked edge following a stopping condition. Under a third technique, mathematical morphology techniques are employed to close severe gaps formed in bars or other elements in the stored image. Following gap closure, the system continues to track along an edge. Alternatively, rather than tracking along an edge, the system under the invention tracks through a bar or other element in the stored image. The embodiment of the invention is particularly helpful with not only two-dimensional symbols, but also linear bar code symbols.

In a broad sense, the present invention embodies a computer implemented method of analyzing an image of machine-readable visual indicia in a stored image. The stored image is represented by a plurality of pixels, and the machine-readable visual indicia have a predetermined arrangement of geometric shapes. The method includes the steps of: (a) sequentially identifying adjacent pixels along an edge or within a middle of a shape within the stored image; (b) recognizing that the shape suffers from a distortion; (c) determining an orientation of the shape; (d) crossing the shape in a direction approximately equal to ±90 degrees from the determined orientation following the step of recognizing; and (e) identifying an edge point of the another edge following the step of crossing.

The present invention also embodies a computer implemented method of analyzing an image of a data collection symbol in a two-dimensional stored image. The two-dimensional stored image is represented by a plurality of points and the data collection symbol has a pattern of geometric shapes. The method includes the steps of: (a) sequentially identifying adjacent points along an edge of or within a geometric shape in the stored image; (b) determining an orientation of the geometric shape; (c) jumping a selected amount in a direction approximately equal to the determined orientation; and (d) identifying a point of the edge or within the geometric shape following the step of jumping.

Furthermore, the invention embodies a computer-readable medium storing a computer implementable method for analyzing a stored image comprised of a plurality of pixels. The method includes the steps of: (a) detecting a distortion in the stored image wherein the stored image includes an image of a data collection symbol having a plurality of shapes and spaces encoding information, wherein the distortion affects at least one of the shapes of the data collection symbol; (b) applying at least one morphological technique to alter the distortion; and (c) analyzing the stored image following the step of applying.

BRIEF DESCRIPTION OF THE DRAWINGS

FIG. 5A is an enlarged schematic diagram of a portion of a bar suffering breakage.

FIG. 5B is an enlarged schematic diagram of a portion of a bar showing exemplary blockage.

FIG. 7 is an enlarged schematic diagram of a portion of a bar showing exemplary blockage on both sides of the bar.

FIG. 9 is an enlarged schematic diagram of a portion of a bar suffering from exemplary breakage formed through the bar.

DETAILED DESCRIPTION OF THE INVENTION

A machine vision system, and in particular, an apparatus and method for processing images of data collection symbols or other machine-readable images, is described in detail herein. In the following description, numerous specific details are set forth such as specific linear or stacked symbols, specific methods of tracking edges or locating symbols, etc., in order to provide a thorough understanding of the present invention. One skilled in the relevant art, however, will readily recognize that the present invention can be practiced without the specific details, or with other symbols, methods, etc. In other instances, well-known structures or operations are not shown in detail in order to avoid obscuring the present invention.

Figure 1:
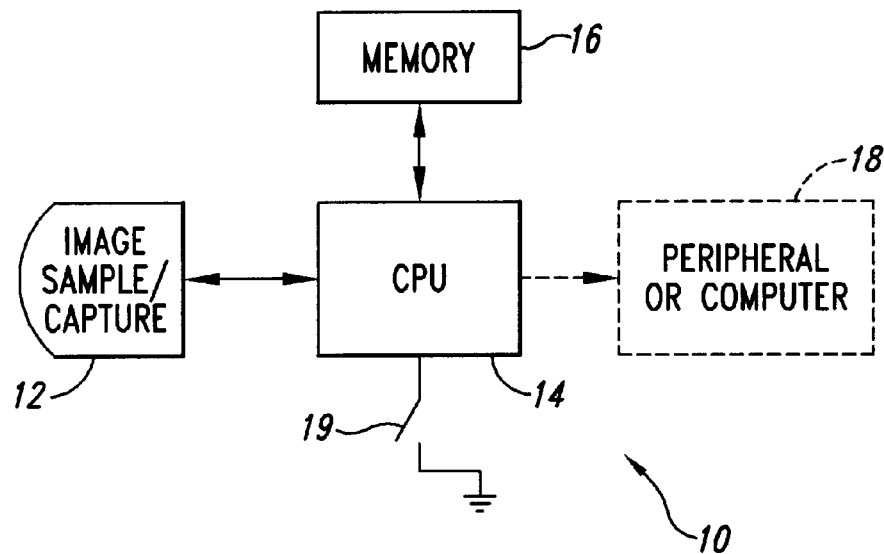
FIG. 1 is a block diagram of a data collection symbology reader of the present invention.

As shown in FIG. 1, a data collection symbology reader 10 under an embodiment of the present invention includes an image sampling or capturing device 12. As used generally herein, a "data collection symbol" refers to a symbol from any of the linear, stacked, area and other machine-readable symbologies. An "area" symbology, such as MaxiCode, Data Matrix or Code One, employs a matrix of data cells rather than one or more rows of bars and spaces. The height and width of each data cell within the matrix are generally equal, and the height and width of the symbol are generally comparable.

In an exemplary embodiment, the image capture device 12 is an area imager that contains an array of photosensitive elements, preferably a charge-coupled device ("CCD") having, for example, a rectangular active surface of pixel elements. Other known area imagers may be used, such as vidicons, two-dimensional semiconductor arrays or a linear CCD array having mechanical means to pivot the array and provide resolution in an axis perpendicular to the linear axis of the CCD array. Additionally, other sized CCD arrays may be used, for example, circular or square CCD arrays. The pixel element array defines the field of view of the area imager. Appropriate conventional focusing optics, electronics and/or a light source (not shown) are also provided as part of the area imager.

As is known, each pixel element in the CCD array of the area imager outputs a gray level signal, i.e., an analog signal that determines the amount or intensity of light impinging upon the particular pixel element. The signals output from the CCD array are similar to video data. While the exemplary embodiment of the image sample/capture device 12 is an area imager, those skilled in the relevant art will readily recognize that other image sampling or capture devices can be employed such as laser scanners, pen-based readers, etc.

A central processing unit ("CPU") 14 receives the video data signals output from the area imager. The CPU 14 preferably includes an analog-to-digital converter that converts the gray level analog signals from the area imager into digital signals. The CPU 14 also preferably includes a clock operating at a high speed so that the CPU similarly operates at a rapid rate.

A memory 16, coupled to the CPU 14, stores the digital signals output from the CPU. The memory 16 preferably includes both volatile and non-volatile memory (e.g., random access and electronically erasable read only memory). An object or image within the field of view of the area imager is converted into electrical signals that are digitized and stored in the memory 16 to be retrieved and processed by the CPU 14 under the routine described below. After processing the stored image, the CPU 14 can output to a peripheral apparatus or computer 18 the results of such processing. The reader 10 may be a hand-held product and include a trigger switch 19 coupled to the CPU 14. By actuating the trigger switch 19, the CPU 14 causes the area imager to provide image signals to the CPU that constitute the instantaneous image within the field of view of the area imager. The specific means and method for storing an image of a symbol by the symbology reader 10 are conventional and will be understood by those skilled in the relevant art without need for further description herein.

Figure 2:
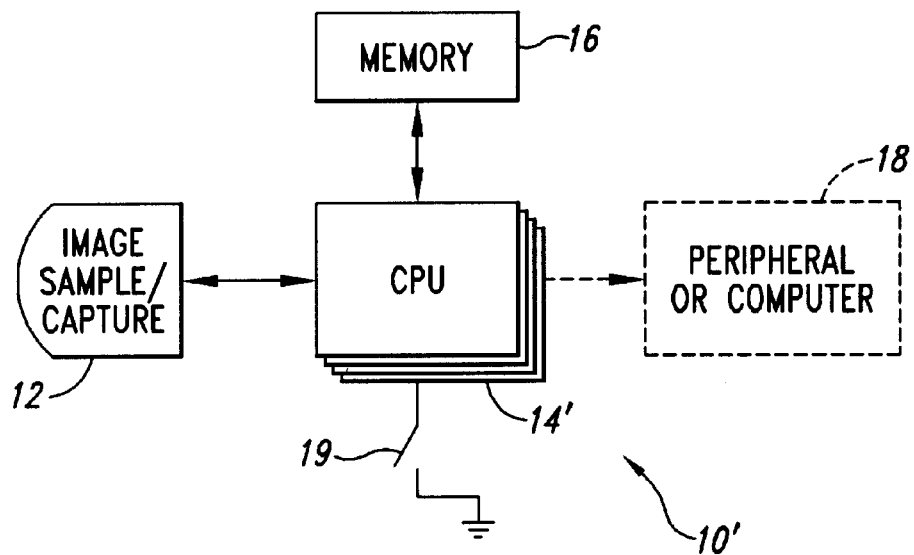
FIG. 2 is a block diagram of an alternate embodiment of the data collection symbology reader of FIG. 1.

Referring to FIG. 2, in an alternative embodiment, a symbology reader 10' includes multiple processors or CPUs 14'. Each of the CPUs 14' can be dedicated to a particular subroutine, or various modules or tasks can be divided among the CPUs based on their availability, as described below. While the present invention is generally described herein with respect to the reader 10 of FIG. 1, those skilled in the relevant art will readily understand that the discussion applies equally to the reader 10' of FIG. 2. In yet another alternative embodiment, the CPU 14 can be replaced by or used together with a digital signal processor (DSP).

Under the embodiment of the present invention described below, the reader 10 or 10' performs several subroutines for compensating for locating portions of symbols that suffer from distortions. As generally used herein, a symbol or stored image suffers from "distortions" if it contains or suffers from damage, spots or voids, printing defects, optical or perspective distortions, surface distortions (e.g., when placed on a non-planar surface), resolution distortions, noise, or any other defects, damage or distortions which cause the symbol or the symbol image to deviate from an ideal symbol/image.

Figure 3:
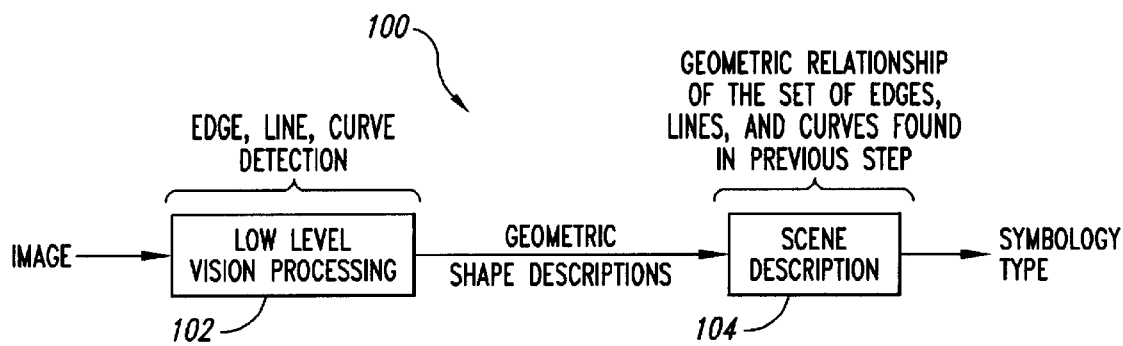
FIG. 3 is a basic block diagram of a method performed by the reader of FIG. 1.

Referring to FIG. 3, a routine 100, executed by the CPU 14, or divided among the CPUs 14', reads an image of a data collection symbol within the memory 16 of the symbology reader 10. The routine 100 is preferably performed with one or more high-speed CPUs, and in readers having two-dimensional sampling of pixels within a stored image. However, the present invention can also be employed with laser scanner readers, pen-based readers, and other known machine-readable symbol readers. The routine 100, and all the routines, subroutines, and methods described herein, can be permanently stored within the non-volatile memory portion of the memory 16.

Those skilled in the relevant art can create source code based on the flowcharts and detailed description provided herein. While the routine 100 is preferably stored in the memory 16, the routine 100 could also be formed as firmware or in hardware.

The routine 100, in sum, performs two routines to abstract information from a stored image. In routine 102, the CPU 14 extracts low-level information from the stored image, such as information regarding edges, lines, curves, or other shapes within the stored image. The routine 102 is particularly tolerant to distortions in the stored image. In routine 104, the CPU 14 employs the edge or shape information to determine groupings or interrelations of such information. For example, the CPU 14 analyzes the length, positioning, spacing, etc., of the determined geometric information to attempt to identify finder patterns for certain symbologies. Therefrom, the CPU 14 in step 104 identifies the symbology type for a symbol image, such as the symbol image in the stored image. As a result, the routine 100 operates as a general autodiscriminator to identify symbols and their corresponding symbologies within a stored image, particularly a distorted image.

Figure 4:
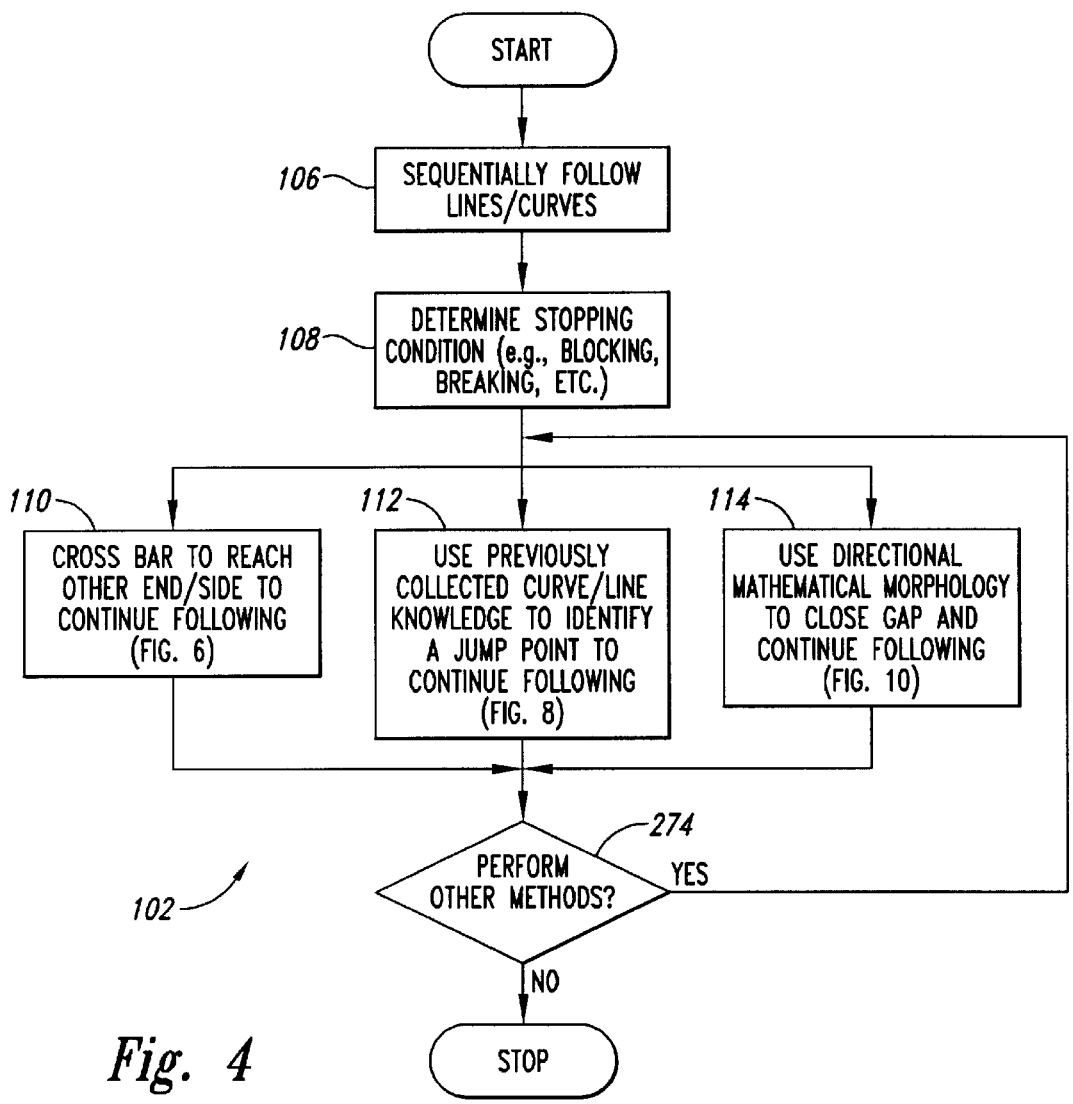
FIG. 4 is a flow diagram of an exemplary method for low-level vision processing performed by the reader of FIG. 1.

Referring to FIG. 4, the routine 102 for abstracting low-level information is shown in greater detail. Prior to performing the routine 102, the CPU 14 produces one or more signals based on light reflected from a symbol, and stores the signals as an image or partial image of the symbol. In an exemplary embodiment, the reader 10 produces an image signal representing the entire symbol and field of view of the reader, which is stored in the memory 16. As used herein, the term "stored image" generally refers to the overall image of the field of view stored in memory 16 that has been produced by the area imager and the CPU 14, and which contains an image of the symbol or symbols to be read.

The memory 16 can includes for processing efficiency an array of memory locations addressed by the CPU 14 that correspond to and represent the pixels in the field of view of the CCD array. The stored image is referenced by a Cartesian coordinate system so that the location of each pixel is represented by a pair of numbers indicating the horizontal and vertical position of the pixel in the stored image. Therefore, objects within the stored image, i.e., areas or groups of pixels, lines/paths formed therethrough, etc., can be arithmetically determined using known geometric and trigonometric properties based on the coordinate system as described herein.

Prior to performing the routine 102, the CPU 14 also determines the location of a starting point of a symbol in the stored image using known techniques such as by using virtual scans of or several sampling paths through the stored image. As a result, the CPU 14 locates at least an edge point of one bar or space in the symbol, or a "defined portion" or finder pattern of a symbol in a given symbology that is unique for that particular symbology. The CPU 14 locates and stores in the memory 16 the Cartesian coordinates of the starting point of each symbol located in the stored image. For a linear symbology, the starting point is preferably a point along an edge between a bar or a space in the symbol, and can be a point along the edge of the outermost bar in the start or stop pattern for the symbol, adjacent to the quiet zone. For a stacked or area symbology, the starting point is preferably a point along an edge of the finder pattern or defined portion. The starting point is preferably at an edge between multiple white pixels (representing the quiet zone) and several black pixels (representing a beginning of the finder pattern, bar or other element within the symbol image).

Referring to FIG. 4, the routine 102 begins in step 106 where the CPU 14 sequentially follows lines or curves in the stored image. For example, the CPU 14 computes or retrieves from the memory 16 the X and Y axes coordinates of the starting point, which is also an edge point, and an orientation Θ of the edge at the starting point. The CPU 14 then pixel by pixel tracks an edge of a line/curve from the starting point. Methods for tracking or sequentially following lines/curves in stored images are well known to those skilled in the art. In general, the terms "pixel" and "point" are used interchangeably herein.

When the CPU 14 determines under step 106 that a currently examined line or curve cannot be tracked, then in step 108 the CPU determines a type of condition that caused the tracking to fail, such as blockage or breakage in the currently examined bar. As shown in FIG. 5A, an exemplary bar 200 contains a partial breakage 202 formed transversely thereto. If the CPU 14 is tracking along an edge 204 containing the breakage 202 (shown by a directional arrow 206), or through a middle of the bar (shown by a directional arrow 208), the CPU will encounter the breakage under step 106. In step 108, then the CPU 14 examines a neighborhood surrounding or forward of a stopping condition pixel (such as a pixel 210 as the CPU tracks along the direction 206). The neighborhood can be, for example, a 3×3 or 5×5 pixel area surrounding the stopping condition of pixel 210. If the CPU determines that pixels in the direction 206 are white, then the CPU determines in step 108 that the bar 200 suffers from breakage.

Conversely, a bar can suffer from blockage. As shown in FIG. 5B, a bar 212 suffers from a blockage 214, which is shown as a dark portion extending transversely and downwardly from the edge 204 of the bar 212. Therefore, as the CPU 14 tracks in the direction 206, the CPU encounters the blockage 214. When examining in a neighborhood surrounding the stopping condition pixel 210, the CPU 14 determines in step 108 that one or more pixels in the direction 206 are black pixels, and therefore, the CPU determines that the bar 212 suffers from blockage. (If the CPU 14 were tracking the bar 212 through a middle of the bar, then the CPU may not suffer a stopping condition due to the blockage 214.) In step 108, the CPU 14 can also examine both edges of the bar 200 to determine whether the breakage 202 extends completely through the bar, or whether the blockage 214 extends along both edges of the bar.

Figure 6:
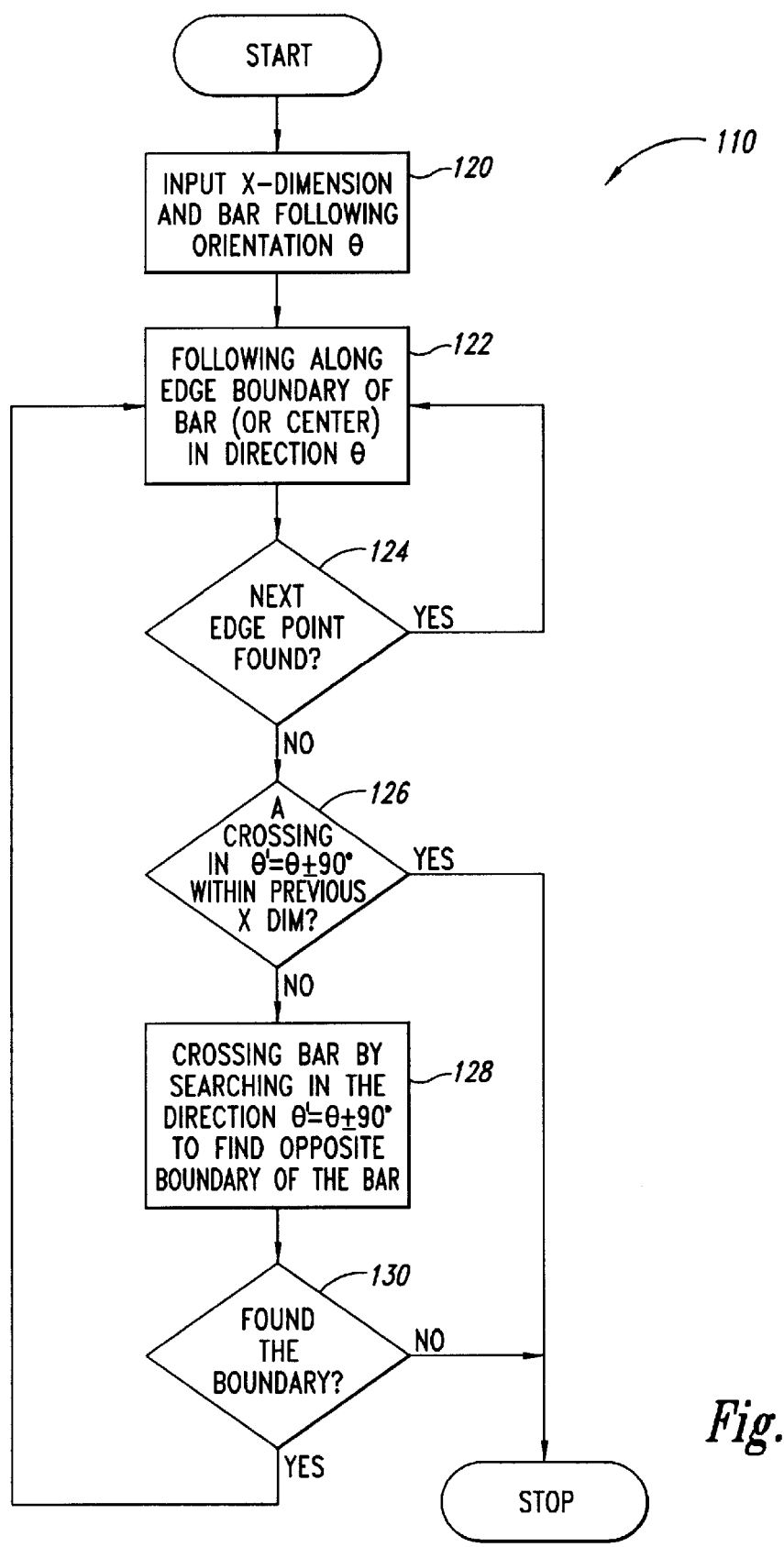
FIG. 6 is a flow diagram of an exemplary subroutine for identifying an opposite edge of a bar to compensate for breakage or blockage, such as that shown in FIGS. 5A and 5B.

If the breakage or blockage affects only one edge of the bar, then the CPU 14 performs a subroutine 110 wherein the CPU crosses to another or opposite edge of a currently tracked element to continue sequentially following or tracking pixels along such other edge. Referring to FIG. 6, the subroutine 110 begins in step 120 wherein the CPU inputs an X dimension for the bar, and a following or tracking orientation Θ which defines a direction along which the CPU had been following the bar until the stopping condition occurred. As is known, the "X dimension" of a symbol is the nominal width dimension of the narrow bars and spaces or data cells in a data collection symbol. Methods of determining an X dimension for a data collection symbol are known to those skilled in the relevant art.

In step 122, the CPU 14 follows along the edge 204 in the direction Θ (i.e., the direction 206 of FIGS. 5A and 5B). In step 124, the CPU 14 determines whether a next edge point has been found. If so, then the subroutine 110 loops back to step 122. If not, such as when the CPU 14 detects the stopping condition pixel 210, then in step 126 the CPU determines whether the CPU has crossed in a direction Θ' equal to Θ plus or minus 90 degrees within a previous distance approximately equal to the X dimension. In other words, the CPU 14 in step 126 ensures that the it has not already attempted to cross the currently tracked bar to locate an opposite edge. If so, then the CPU determines that the subroutine 110 is ineffective in compensating for the stopping condition, and therefore the subroutine stops and returns to the routine 102 (to possibly perform additional subroutines). If the CPU 14 has not already crossed the bar within a previous X dimension, then in step 128 the CPU crosses the current bar by searching in the direction Θ' to find an opposite boundary or edge of the currently examined bar.

For example, referring to FIGS. 5A and 5B, if the CPU 14 stops at the stopping condition pixel 210 along the edge 204, then the CPU examines or tracks pixels 90 degrees from the edge 204 and through the bar 200 (upward) to locate an opposite edge 216 of the bar. In step 130, the CPU 14 determines whether a boundary or edge has been found. If the CPU 14 detects the edge 216, then the subroutine 110 loops back to step 122 and the CPU continues to track along the edge 216 in the direction Θ (i.e., in a direction 218, as shown in FIGS. 5A and 5B). If no boundary has been found in step 130, then the CPU 14 quits the subroutine 110 and returns to the routine 102.

Referring back to FIG. 4, the CPU 14 in step 108 can determine that a bar suffers from blockage on both edges of the bar. Referring to FIG. 7, an exemplary bar 220 suffers from a downwardly extending blockage 222, and an opposite, upwardly extending blockage 224. As a result, both the lower edge 204 and the upper edge 216 suffer from transversely extending blockages 222 and 224, respectively, so that both of the tracking directions 206 and 218 encounter the blockages 222 and 224, respectively. The subroutine 110 (FIG. 6) would be ineffective against the "double blockage" which affects the bar 220. Therefore, in a subroutine 112, the CPU 14 employs previously collected curve or line information to identify a jump point to jump over the blockage 222 or 224 to continue tracking the edge 206 or 216, respectively, thereafter.

Figure 8:
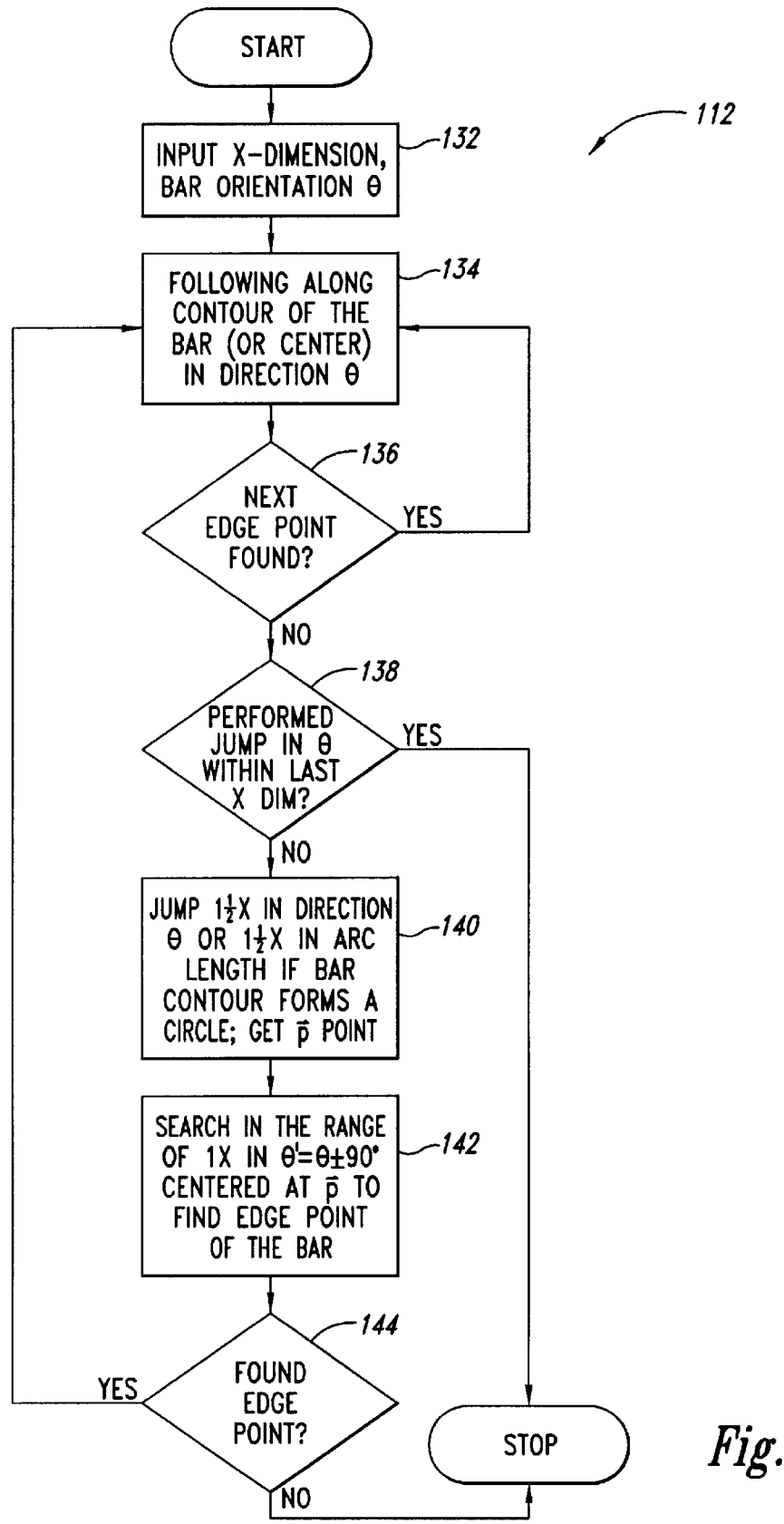
FIG. 8 is a flow diagram of an exemplary subroutine for jumping along an edge to compensate for blockage, such as that shown in FIG. 7.

Referring to FIG. 8, the subroutine 212 begins in step 132 where the CPU 14 inputs the X dimension and bar tracking or edge orientation Θ. In step 134, the CPU 14 tracks or follows along the edge of the bar (or through its longitudinal center) in the direction Θ. In step 136, the CPU 14 determines whether a next edge point has been found. If so, the subroutine 112 loops back to step 134. If not, such as when the CPU 14 encounters the stopping condition pixel 210 along the edge 204 (FIG. 7), then in step 138 the CPU determines whether the CPU has performed a forward jump in the direction Θ within a previous X dimension distance. In other words, the CPU 14 determines whether it has previously performed a jump in the desired direction within a short distance or number of pixels. If not, then in step 140 the CPU 14 jumps a distance relatively short with respect to the size of the bar, e.g., a distance equal to 1.5 X dimensions. The CPU 14 jumps linearly in the direction Θ if the currently tracked bar forms a line. Alternatively, if the currently tracked bar forms an arc length or curve, then the CPU 14 jumps a distance approximately equal to 1.5 X dimensions in arc length. The CPU 14 can determine whether a currently tracked bar forms a line or curve by determining whether the equation of a line or some curve best fits through the previously tracked pixels. If a second order equation of a curve fits the previously tracked pixels, then the CPU 14 recognizes that the currently tracked bar forms a curve. The CPU 14 in step 140 can perform any conventional curve fitting technique that estimates curves formed by elements in the stored image. Additionally, in step 140, the CPU 14 attains the coordinates of a point $\vec{P}$ opposite the blockage in the direction Θ.

In step 142, the CPU 14 searches in a direction approximately equal to Θ'=Θ±90 degrees, for a distance equal to approximately one X dimension to define an edge point. For example, as shown in FIG. 7, assuming the CPU 14 stopped at the stopping condition pixel 210 and then jumped to the pixel 226, the CPU 14 would then examine pixels upwardly (−90 degrees) to again locate the edge 204. The CPU 14 locates the edge following a jump by analyzing pixels up to one X dimension away from the point $\vec{P}$ in the direction Θ' approximately equal to Θ±90 degrees depending upon the direction of the bar previously tracked.

In step 144, the CPU 14 determines whether an edge point has been found. If so, then the subroutine 112 loops back to step 134 and the CPU again tracks along the edge (e.g., along the edge 204 of FIG. 7). If an edge point is not found in step 144, or the CPU has already performed a jump one X dimension ago under step 138, then the subroutine 112 ends and the CPU 14 returns to the routine 102.

Referring back to FIG. 4, the CPU 14 can determine in step 108 that the currently tracked bar suffers from a complete breakage. Referring to FIG. 9, an exemplary bar 230 suffers from a complete break or gap 232 formed transversely therethrough. If the CPU 14 tracks along the edge 204 in the direction 206 or along the edge 216 in the direction 218, or even through a middle of the bar (shown by an arrow 234), the CPU will encounter the gap 232. The subroutines 110 and 112 would not likely be able to compensate for the gap 232. Therefore, the CPU 14 under a subroutine 114 uses mathematical morphology to close the gap 232 and continue tracking the bar 230 following gap closure.

Figure 10:
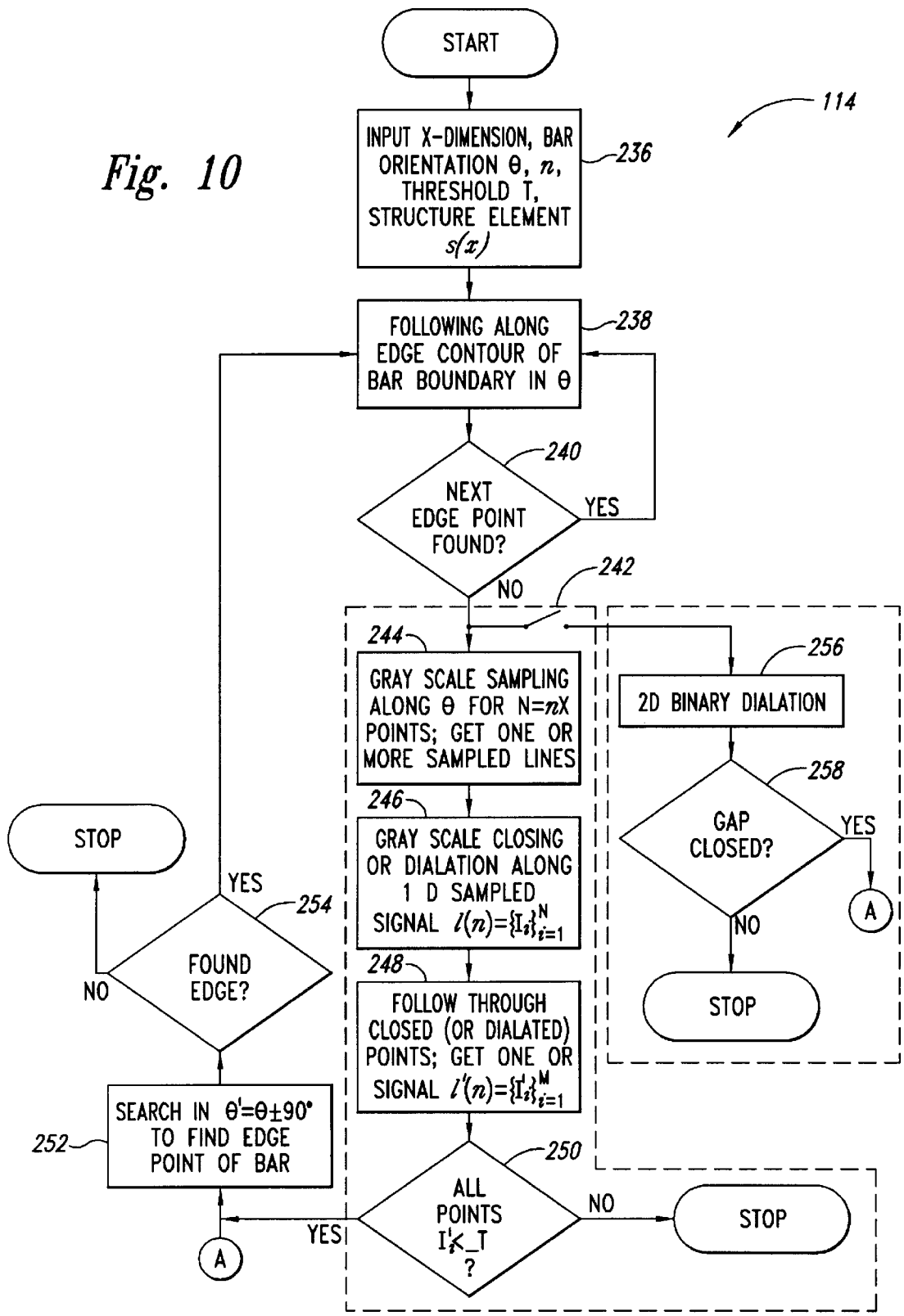
FIG. 10 is a flow diagram of an exemplary subroutine for employing morphological techniques to close the breakage or gap, such as that shown in FIG. 9.

Referring to FIG. 10, the subroutine 114 begins in step 236 by inputting the X dimension, the bar or edge orientation Θ, a value n, a threshold T, and a structuring element s(x). The value n corresponds to a number of X dimensions, such as three, that the CPU 14 samples or examines through a gap, and therefore the value n approximately corresponds to a maximum gap that the CPU will attempt to close. The threshold T corresponds to a gray scale threshold used to determine whether the gap has been successfully closed. The threshold T is based on an approximate mean gray scale value. For example, if black elements in the stored image has a maximum gray scale or intensity value of 2, while the white elements in the stored image have a maximum intensity value of 12, then a mean value from these values corresponds to (12−2)/2=5. However, if the CPU 14 is currently tracking along the edge of a bar (which has a low intensity value close to 5), then the value of the maximum bar intensity value (i.e., 2) is added thereto, to produce a threshold value T equal to 7.

The structuring element s(x) corresponds to a geometric element used to probe an image, for example, to mark locations at which the structuring element fits within the image. By marking the locations at which a structuring element fits within an image, the CPU 14 derives structural information concerning the image. Under the subroutine 114, the CPU 14 analyzes a one-dimensional image (for signal processing) and/or a two-dimensional image (for image processing) taken from a Euclidean binary or digital image. As shown below, the structuring element s(x) in a one-dimensional signal processing element such as a pyramid-shaped structuring element.

In step 238, the CPU 14 tracks along the edge of the bar in the direction Θ. In step 240, the CPU 14 determines whether a next edge point has been found. If so, then the subroutine 114 loops back to the step 238. If not, then the CPU 14 performs either a one-dimensional mathematical morphology routine (under steps 244–250), or a two-dimensional mathematical morphology routine (under steps 256–258). A software switch (represented by switch 242) can be set by the CPU 14 to determine whether the CPU performs either the one- or two-dimensional mathematical morphology processing. The CPU 14 can select a state of the switch 242 based on historical information derived from the image being currently analyzed, be factory set based on a type of symbology that the reader 10 will analyze, etc. Alternatively, the CPU 14 could perform both the one- and two-dimensional mathematical morphology routines under all steps of the subroutine 114. After performing all of such steps, the CPU 14 can then analyze the output from both one- and two-dimensional processing routines to select a best result.

Considering first the one-dimensional routine, the CPU 14 in step 244 performs gray scale sampling of pixels in the direction Θ for a number of pixels N=nX (i.e., three times the X dimension). The CPU under step 244 obtains at least one sample line or waveform, such as a linear series of pixels, where each pixel in the line has a corresponding gray scale value. Alternatively, the CPU 14 can upsample the sampled line of pixels to obtain a greater number of sample points, which could provide more efficient processing for certain digital signal processors (even though the substantially same amount of data results).

In step 246, the CPU 14 performs morphological dialation or closing along the one-dimensional sampled signal, where the sampled signal is represented by the following equation:

$$l(n) = \{I_i\}_{i=1}^{N} \qquad (1)$$

where l(n) is the sampled signal which consists of a set of intensity values $I_i$ where i extends from an initial pixel 1 to a final pixel N.

Referring to FIG. 10, an exemplary step or subroutine 246 for performing gray scale dialation of a one-dimensional sampled signal is shown. The subroutine 246 begins in step 260 where the CPU 14 inputs the structuring element s(n), the sampled line l(n), and the X dimension. The structuring element s(n) is represented by the following equation:

$$s(n) = \{s_j\}_{j=1}^k \quad (2)$$

where j=[0, 1, . . . , k], and where k is greater than the X dimension (e.g., 1.3 times the X dimension).
where j=[0, 1, . . . , k], and where k is greater than the X dimension (eg., 1.3 times the X dimension).

In step 262 the CPU 14 sets a counter value j to zero. In step 264, the CPU 14 determines whether the counter value j is equal to k. If not, then in step 266, the CPU 14 performs dialation of the one-dimension sampled signal using the structuring element. Mathematically, "erosion" and "dialation" are basic binary non-linear image processing techniques known as binary mathematical morphology techniques. In general, the "erosion" of a set l by a set (or structuring element) s is denoted by l⊖s, which can be represented as:

$$l \ominus, s = \bigcap \{l - S(x) : x \in R[s]\} \quad (3)$$

also known as Minkowski subtraction. As is known, if the origin lies within the structuring element, then erosion has the effect of shrinking an input image. Minkowski subtraction is in general erosion by a rotated structuring element, which is rotated about the origin.

"Dialation" is the dual of erosion, and is represented as follows:

$$l \oplus s. \quad (4)$$

If the structuring element contains the origin, then dialation of l by S results in an expansion of l. The CPU 14 under the subroutine 246 preferably performs dialation under Minkowski addition, which is defined by the following equation:

$$l \oplus S = \bigcup \{l_x + S(x) : x \in R[s]\} \quad (5)$$

In step 266, the CPU 14 performs gray scale dialation of the one-dimensional sampled signal under the following equation:

$$Q_j(n)|_{n=1}^N = l(n+j) + s(j) \text{ for } n+j \leq N, \text{ and } n+j \geq 1; \quad (6)$$

$$Q_j(n) = -\infty \text{ if } n+j > N \text{ or } n+j < 1$$

where $Q_j(n)$ represents intermediate gray scale dialation values in the one-dimensional sampled line for the first value in the structuring element s(n). In step 268, the CPU 14 increments j (i.e., j=j+1), and then loops back to step 264. The CPU 14 performs steps 264–268 for all k points in the structuring element s(n) until j=k. Thereafter, in step 270, the CPU 14 produces a new series of pixels or points for the one-dimensional sampled line based on the following equation:

$$l'(n) = \max_{\forall j} \{Q_j(n)\} \quad (7)$$

Under step 270, the CPU 14 selects a maximum value in the set P(n) for each value j. In other words, the structuring element s(n) produces a series of gray scale dialation points for each value j. The CPU 14 under step 270 selects a maximum value from each of such series of points as the dilated signal.

Thereafter in step 272, the CPU 14 outputs a new one-dimensional sample line or dialated signal based on the gray scale dialation as:

$$l'(n) = l(n) \oplus s(n) = \{l'_i\}_{i=1}^M \quad (8)$$

where the set l'(n) represents a discrete set of points having intensity values I'. Under morphological operations, such as dilation, the CPU 14 can produce a dilated signal having a number of points differing from a number of points in the original sample signal, and therefore, the number of points M in the new signal does not necessarily equal the number of points N in the original signal.

Figure 13:
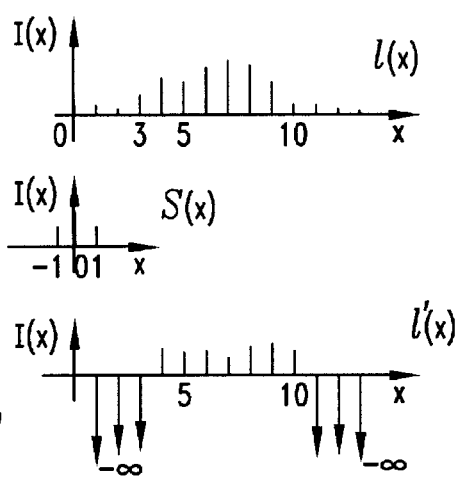
FIG. 13 shows an exemplary one-dimensional sampled gray scale signal l(x), a structuring element or signal s(x), and a resulting dilated signal l'(x).

Referring to FIG. 13, an exemplary sampled signal l(x) is shown, having initial intensity values I(x) that are very low, but then increase at point 3 and thereafter have relatively high intensity until point 9 when the intensity drops back to a low intensity. The points 3 through 9 represent a gap formed in a bar, such as the gap 232 forming the bar 204 (FIG. 9). A pyramid-shaped structuring element s(x) has a high intensity value centered at 0 with slightly lower intensity values at points −1 and 1, and 0 thereafter. Dilating the structuring element −s(x) on the sample signal l(x) results in the dilated signal l'(x) as shown in FIG. 13. As shown by the dilated signal l'(x), the intensity values of points 3 through 9 are reduced, indicating that the gap has been closed.

Referring back to FIG. 10, in step 248, the CPU 14 follows through all of the newly calculated dialated points in this signal l"(n). In step 250, the CPU 14 determines whether all the points in the dialated signal l"(n) are less than the threshold T. In other words, the CPU 14 in step 250 determines whether the intensity value $I'_i$ of each pixel in the dialated signal is below the bar threshold to indicate that the gap has been closed. (Of course, if a gap in a space were to be dialated, then the threshold T would be adjusted, and the CPU 14 would determine whether the points in the dialated signal correspond to a minimum gray scale value for a space to thereby determine that the gap had been closed.) If at least one pixel has an intensity value greater than the threshold T, then the CPU 14 ends the subroutine 114, and returns to the main routine 102. However, if the gap had been successfully closed (as determined in step 250), then in step 252, the CPU 14 searches in a direction Θ' which is equal to Θ±90 degrees to find an edge point of a bar. In other words, the CPU 14 had successfully closed, and crossed, the gap, and therefore the CPU looks for an edge point following the gap, in a manner similar to that described above with respect to steps 128 and 142 (of FIGS. 6 and 8, respectively).

In step 254, the CPU 14 determines whether an edge point has been found. If not, then the subroutine 114 ends, and the CPU returns to the main routine 102. If an edge point had been found, then the subroutine 114 loops back to step 138, and the subroutine continues.

Rather than performing gray scale dialation, the CPU 14 in step 246 can instead perform gray scale closing of the one-dimensional sampled signal. While erosion and dialation are primitive building blocks of binary morphological (non-linear) processing, closing (and opening) are slightly more complex secondary morphological operations. Closing is defined as dialation of a set by a structuring element, followed by erosion of the result by the structuring element. Closing is represented by the following equation:

$$l(n) \cdot s(n) = [l(n) \oplus (-s(n))] \ominus (-S(n)) \quad (9)$$

Figure 11:
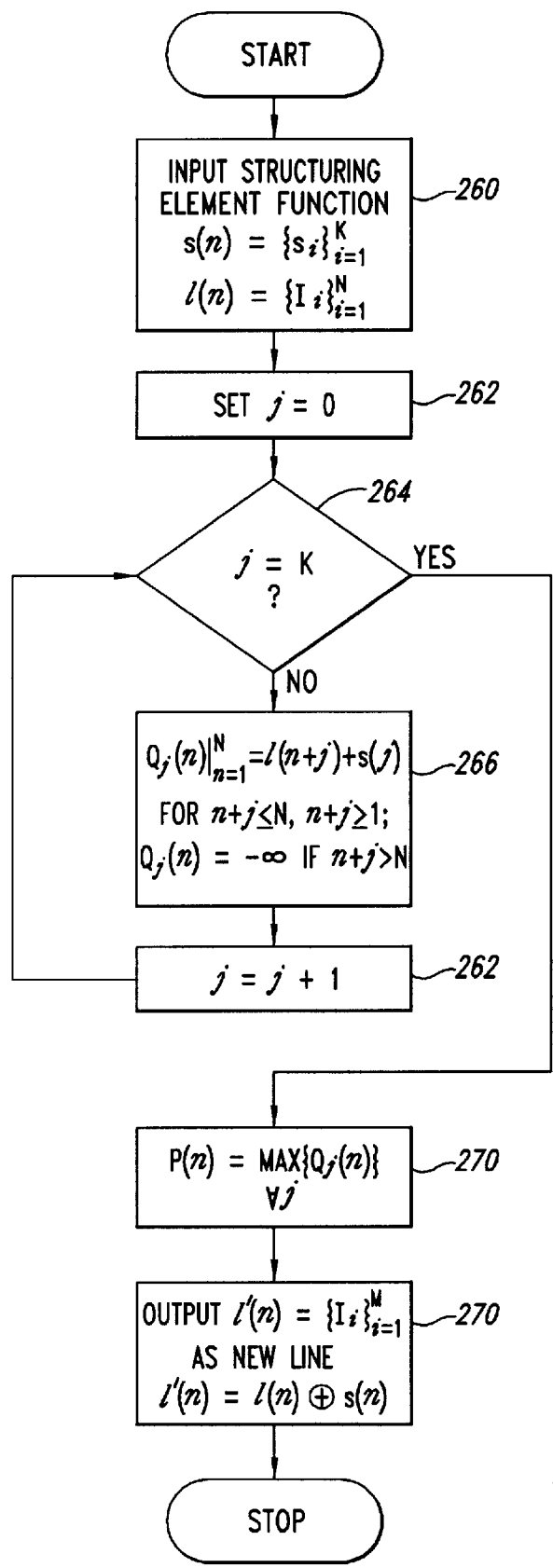
FIG. 11 is a flow diagram of an exemplary subroutine for performing gray scale dialation under the subroutine of FIG. 10.

For gray scale closing, the CPU 14 first performs the steps of the subroutine 246 to perform dialation, as explained above. Thereafter, the CPU 14 performs, in general, the same steps of the subroutine 246 (FIG. 11) for erosion, except that in step 266, the CPU performs the following equation:

$$Q_j(n)|_{n=1}^{N} = l(n-j) + s(j), \qquad (10)$$

and in step 270, performs the following equation:

$$l'(n) = \min_{\forall j} \{Q_j\}, \qquad (11)$$

to take the minimum from each eroded sample set. Therefrom, the CPU 14 can compute the closing of the one-dimensional sampled line l(n) by the structuring element s(n) under the subroutine 246 (i.e., l(n)·s(n)). In sum, the CPU 14 performs the steps under the subroutine 240 twice, once for dialation (as shown in FIG. 11), and thereafter for erosion (with equations (10) and (11) substituted therein). While dialation can close small gaps in a bar or other element suffering from complete breakage, closing can still close a gap, but with less altering of the original signal or image. However, closing requires, in general, twice the number of steps as simple dialation, and therefore requires additional processing time by the CPU 14.

Referring back to FIG. 10, if the switch 242 is activated, then the CPU 14 performs two-dimensional binary dialation under steps 256–258. An exemplary two-dimensional structuring element B for two-dimensional dialation can be a small square centered about the origin where a length of a side of the square is greater than a distance of the targeted gap in the stored image. Alternatively, the two-dimensional structuring element B can be a small disk centered about the origin having a diameter greater than the targeted gap. In general, two-dimensional dialation is represented by the following equation:

$$A \oplus B = \bigcup \{B + a = a \in A\}. \qquad (12)$$

The CPU 14 under equation (12) shifts the structuring element B through every point of the targeted gap and region surrounding the gap (e.g., a bar suffering complete breakage). A two-dimensional dialation under the CPU 14 is similar to steps shown in FIG. 11, except that processing occurs once in the X axis direction, and then again in the Y axis direction.

Referring back to FIG. 4, after performing the steps of the subroutines 110, 112, and/or 114, the CPU 14 determines in step 274 whether to employ additional methods or subroutines. For example, if the CPU 14 fails to reach the other edge of the bar under the subroutine 110, the CPU can perform the gap closure subroutine 114 in an additional attempt to overcome the stopping condition. The CPU 14 may perform the routine 102 of FIG. 4 more than once to identify points along the edge of more than one element in the stored image. As a result, the CPU 14 after performing the routine 102 more than once stores in the memory 16 the coordinates of linked points of edges of elements in the stored image.

Figure 12:
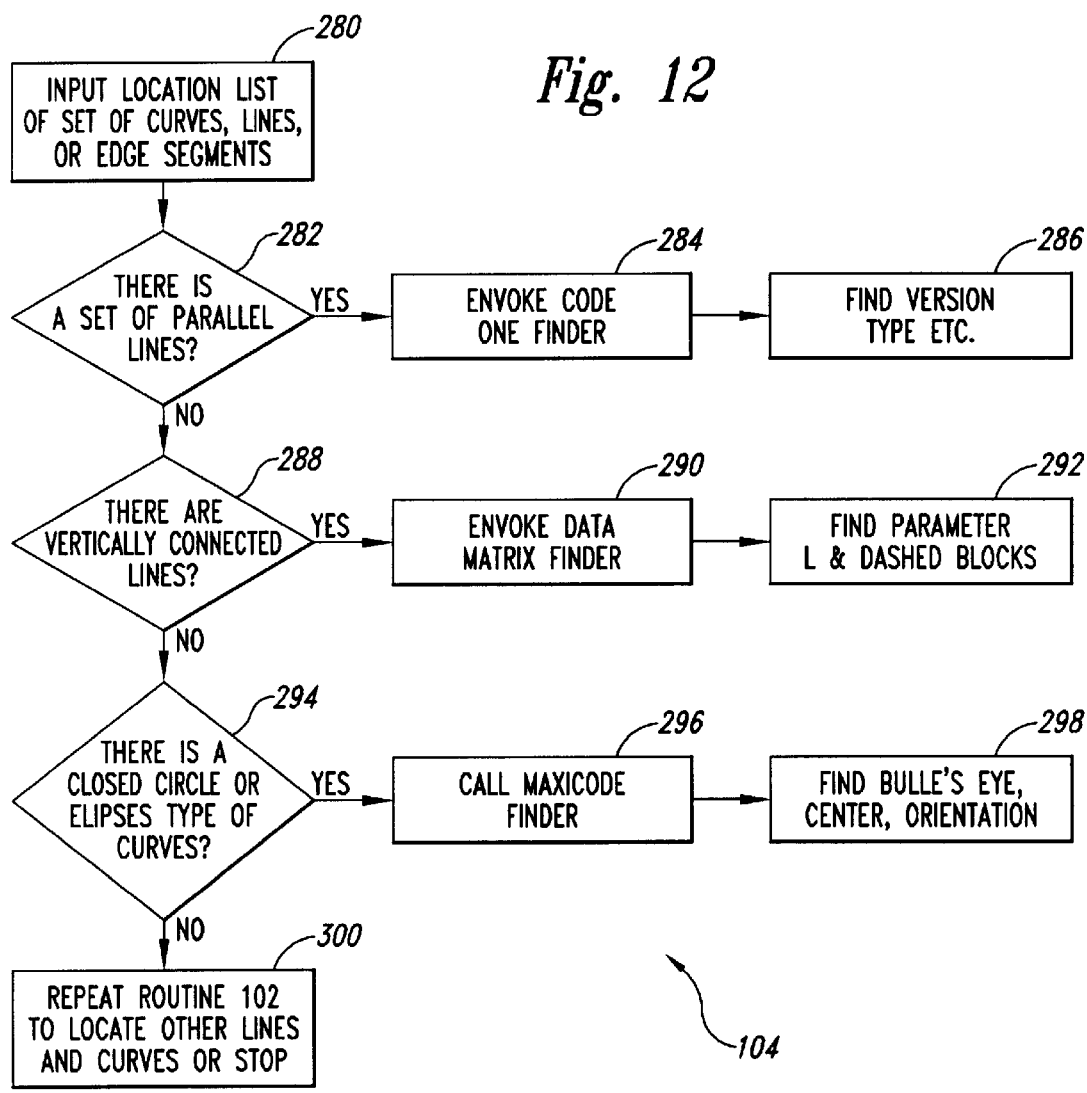
FIG. 12 is a flow diagram of an exemplary routine for determining a relationship of data derived from the low-level vision processing of FIG. 4, as performed by the reader of FIG. 1.

After the CPU 14 identifies points along the edge of at least one element or shape under the routine 102, the CPU begins the step or routine 104. Referring to FIG. 12, the CPU 14 in step 280 inputs the list of locations of all linked edge points or other points of curves, lines, or edge segments identified under the routine 102. In step 282, the CPU 14 analyzes the list of linked points to determine whether two or more parallel lines have been identified under the routine 102. If so, then the CPU 14 in step 284 presumes that a Code One symbol image has been located within the stored image. Therefore, the CPU 14 invokes a conventional Code One finder routine to more accurately locate the similar image of the Code One symbol within the stored image. For example, the CPU 14 performs a method of locating the center finder pattern for Code One symbols that is described in detail in the inventor's U.S. patent application Ser. No. 08/607,100, entitled "Method and Apparatus for Accurately Locating Data Regions in Stored Images of Symbols," filed Feb. 26, 1996. The finding method employed under step 284 can employ data previously determined under the routines 102 and 104, and thereby avoid performing redundant steps and speed of processing. In step 286, the CPU 14 determines the particular version of the Code One symbol image, and thereafter decodes the symbol image.

If the CPU 14 fails to identify two or more parallel lines in the list of linked points, then in step 288 the CPU determines whether two lines have been identified, one horizontal and one vertical, which meet at approximately 90°. If so, then in step 290, the CPU 14 presumes that the symbol image of a Data Matrix symbol has been located. Therefore, the CPU 14 in step 290 invokes a conventional Data Matrix finding routine. For example, the CPU 14 performs the inventor's method which is described in detail in U.S. patent application Ser. No. 08/654,925, entitled "Method and Apparatus for Locating and Decoding Machine-Readable Symbols, Including Data Matrix Symbols," filed May 29, 1996. Again, the CPU 14 can employ data previously determined under the routines 102 and 104 to omit redundant steps when locating the Data Matrix symbol image. In step 292, the CPU 14 locates the solid and dashed boundaries or finder pattern for the Data Matrix symbol image, determines its version, and thereafter decodes the symbol image.

If the CPU 14 determines that the list of linked points fails to identify a horizontal and vertical line connected at approximately 90°, then in step 294 the CPU determines whether closed rings, circles or ellipses, or portions thereof are detected. If so, then in step 296, the CPU 14 presumes that the symbol image of a MaxiCode symbol has been located within the stored image. The CPU 14 invokes a MaxiCode finding method to locate the MaxiCode symbol image within the stored image. For example, the CPU 14 locates the center bull's eye finder pattern of the MaxiCode symbol image under a method described in detail in U.S. patent application Ser. No. 08/602,624, entitled "Method and Apparatus for Locating and Decoding Machine-Readable Symbols," filed Feb. 16, 1996, or a method described in detail in U.S. patent application Ser. No. 08/549,916, entitled "Method and Apparatus for Locating and Decoding Machine-Readable Symbols," filed Oct. 30, 1995. In step 298, the CPU 14 locates the center finder pattern, determines the orientation of the MaxiCode symbol image, and thereafter decodes the symbol.

If the CPU 14 fails to identify two or more parallel lines, a connected horizontal and vertical line, or one or more rings or substantially closed curves, then the CPU 14 in step 300 repeats the routine 102 and attempts to locate one or more lists of linked points for curves, lines or edges in the stored image. Thereafter, the CPU 14 again performs the steps of routine 104. If the CPU 14 fails to again locate a list of linked points, such as points which exceed a minimum threshold number of pixels, then the routine 104 ends.

The stored image can include more than one symbol image. Therefore, following steps 286, 292 or 298, the CPU 14 can again perform steps 280 through 298 as the CPU attempts to locate symbol images of other symbols stored within the stored image. Additionally, while the routine 104 is described above as locating only three area symbologies (Code One, Data Matrix and MaxiCode), the routine 104 can identify the distinctive lines, curves or other geometric shapes of the distinctive patterns or finder patterns of other data collection symbologies to locate symbols from such symbologies in the stored image. Furthermore, while the exemplary embodiment is generally described above with respect to the single CPU 14 of the reader 10, the routine 100 can be divided among the multiple CPUs 14' of the reader 10'. For example, each of the CPUs 14' can be assigned to perform one of the distortion compensating subroutines.

Overall, an important step in locating a symbol image within a stored image under the routine 104 is to locate the predetermined pattern of a symbol image (typically the finder pattern in an area symbol). As noted above, most finder patterns consist of basic geometric elements such as bars or rings. Under the routine 100, the CPU 14 can identify various geometric shapes by sequentially linking edge, center or other points within the stored image. As a result, the routine 102 compensates for distortions and locates basic geometric elements. The routine 104 then compares such located elements to identify one or more patterns corresponding to finder patterns of symbologies. Since the CPU 14 knows before hand that it is looking for such basic geometric patterns, the routine 102 can employ one or more distortion compensating routines for identifying linked points in the stored symbol image. For example, such distortion compensating subroutines compensate for breakage, gaps, blockage, or other distortions which can effect an edge or other portion of an element in a symbol image or shape in a stored image. While other known routines stop at an edge (or lack thereof), the embodiments of the present invention attempt to continue through such distortions in the symbol image to compensate for such distortions.

Although specific embodiments of, and examples for, the present invention are described herein for illustrative purposes, various equivalent modifications can be made without departing from the spirit and scope of the invention, as will be recognized by those skilled in the relevant art. The teachings provided herein of the present invention can be applied to other machine vision systems, not necessarily the exemplary data collection symbology reader described above. Various exemplary distortion compensating subroutines, and techniques for identifying shapes or geometric patterns of data collection symbols have been described above, and accordingly, various other subroutines, etc., can be employed under the present invention and a greater or lesser number of subroutines can be employed.

For example, the routine 104 can employ a spline function, such as a non-uniform rational B-spline function to represent perfect curves through several points in each list of linked points. By employing a spline function, the routine 104 can more accurately identify shapes within the stored image, if necessary.

While embodiments of the present invention are generally described above as tracking or sequentially following an edge of an element in a data collection symbol, the present invention can be adapted by those skilled in the relevant art to track through centers or other pixels in elements of the symbol. Additionally, while embodiments of the present invention are generally described above as identifying elements of data collection symbols, the present invention can be applied to identifying shapes within a stored image to facilitate, for example, automated machine vision functions, such as movement of a robotic arm. Additionally, one or more of the subroutines under the routine 102 (FIG. 4) can be employed alone in a computer to compensate for distortions in a stored image to identify shapes in the image.

All of the above U.S. patents and applications are incorporated herein by reference as if set forth in their entirety. While the present invention identifies an image of a data collection symbol, the present invention can similarly read visual indicia of other stored images.

These and other changes can be made to the invention in light of the above detailed description. In general, in the following claims, the terms used should not be construed to limit the invention to the specific embodiments disclosed in the specification and the claims, but should be construed to include all machine vision systems that operate under the claims to provide a method for compensating for image distortion/degradation and accurately locating visual indicia. Accordingly, the invention is not limited by the disclosure, but instead its scope is to be determined entirely by the following claims.

What is claimed is:

1. In a symbol reading apparatus capable of storing an image of a data collection symbol, the stored image being comprised of a plurality of pixels and the symbol having a predetermined pattern of geometric shapes, a method of locating portions of the shapes within the stored image, the method comprising:

sequentially identifying adjacent pixels along an edge of a shape within the stored image;

performing at least one distortion compensating subroutine selected from a plurality of distortion compensating subroutines if an adjacent pixel cannot be located due to a distortion, wherein the at least one distortion compensating subrouting is selected from a first subroutine that crosses the shape to identify another edge of the shape, a second subroutine that jumps over the distortion, in a direction corresponding to an orientation of the edge, to identify an edge point on the edge following the distortion and without filling in the adjacent pixel, and a third subroutine that morphologically alters the distortion to cross the distortion and identify an edge point on the edge following the distortion;

continuing sequentially identifying adjacent pixels following the distortion;

producing a set of pixels that identify at least a portion of the shape based on the sequentially identifying, performing and continuing;

determining if the set of pixels contains representations of one of several selected patterns of geometric portions for corresponding data collection symbology types, a first selected pattern corresponding to the predetermined pattern of geometric shape of the data collection symbol and which does not represent widths of a plurality of shapes as measured along an intersecting sampling path; and identifying the data collection symbol in the stored image if the detected geometric portions correspond to the first selected pattern.

2. The method of claim 1 wherein the performing at least one distortion compensating subroutine includes:

determining the orientation of the edge;

crossing the shape in a direction approximately equal to plus or minus 90 degrees from the edge orientation; and identifying an edge point of the another edge following crossing the shape.

3. The method of claim 1 wherein performing at least one distortion compensating subroutine includes:
- determining the orientation of the edge;
- jumping a selected amount in a direction approximately equal to the edge orientation; and
- identifying an edge point of the edge following jumping the selected amount.

4. The method of claim 1 wherein performing at least one distortion compensating subroutine includes:
- determining the orientation of the edge;
- sampling a selected number of pixels through the distortion in a direction approximately equal to the edge orientation to produce a one dimensional sampled signal;
- morphologically dilating the one dimensional sampled signal based on a one dimensional structuring signal; and
- identifying an edge point of the edge following morphologically dilating.

5. The method of claim 1 wherein performing at least one distortion compensating subroutine includes:
- determining the orientation of the edge;
- sampling a selected number of pixels through the distortion in a direction approximately equal to the edge orientation to produce a one dimensional sampled signal;
- morphologically closing the one dimensional sampled signal based on a one dimensional structuring signal; and
- identifying an edge point of the edge following morphologically closing.

6. The method of claim 1 wherein performing at least one distortion compensating subroutine includes:
- sampling a selected number of pixels through the distortion to produce a two dimensional sampled image;
- morphologically dilating the two dimensional sampled image based on a two dimensional structuring image element; and
- identifying an edge point of the edge following the step of morphologically dilating.

7. The method of claim 1 wherein performing at least one distortion compensating subroutine includes identifying a second order curve fitting the sequentially identified adjacent pixels along the edge of the shape.

8. The method of claim 1 wherein determining if the set of pixels contains representations includes:
- determining if the set of pixels contains at least two parallel lines, and if so, determining that the data collection symbol is a Code One symbol;
- determining if the set of pixels contains at least two lines having ends intersecting at approximately 90 degrees, and if so, determining that the data collection symbol is a Data Matrix symbol; and
- determining if the set of pixels contains at least a partially enclosed curve, and if so, determining that the data collection symbol is a MaxiCode symbol.

9. A computer implemented method of locating an image of machine-readable visual indicia in a stored image, the stored image being represented by a plurality of points and the machine-readable visual indicia having a predetermined pattern of geometric shapes, the method comprising:
- compensating for at least partial breakage for at least one of the geometric shapes in the stored image and compensating for at least partial blockage for at least another of the geometric shapes in the stored image;
- detecting a set of curves in the stored image based on groups of points in the plurality of points, wherein each group of points corresponds to one of the curves and wherein at least some of the curves in the set of curves represent at least portions of the geometric shapes of the predetermined pattern;
- determining if curves in the set of curves correspond to one of several selected patterns of curves for corresponding data collection symbology types, wherein a first selected pattern corresponds to the predetermined pattern of geometric shapes of the machine-readable visual indicia and does not represent widths of a plurality of shapes as measured along an intersecting sampling path; and
- identifying the machine-readable visual indicia in the stored image if curves in the set curves correspond to the first selected pattern.

10. The method of claim 9 wherein detecting a set of curves includes sequentially identifying adjacent points through a middle of at least some of the geometric shapes within the stored image, and wherein at least some of the curves in the set of curves are lines corresponding to identified points through the middle of the geometric shapes of the predetermined pattern.

11. The method of claim 9 wherein compensating includes:
- sequentially identifying adjacent points along an edge of at least some of the geometric shapes within the stored image; and
- performing at least one distortion compensating subroutine if an adjacent point cannot be located due to the breakage or blockage, wherein the at least one distortion compensating subroutine is selected from a first subroutine that crosses the visual indicia to identify another edge of the geometric shapes, a second subroutine that jumps over the breakage or blockage to identify an edge point following the breakage or blockage, and a third subroutine that morphologically alters the breakage or blockage to cross the breakage or blockage and identify an edge point following the breakage or blockage.

12. The method of claim 9 wherein the machine-readable visual indicia is a Code One symbol, and wherein determining if curves in the set of curves correspond to one of several selected patterns of curves includes the step of determining if the detected set of curves contains the first pattern, wherein the first pattern includes at least two parallel lines.

13. The method of claim 9 wherein the machine-readable visual indicia is a Data Matrix symbol, and wherein determining if curves in the set of curves correspond to one of several selected patterns of curves includes determining if the detected set of curves contains the first pattern, wherein the first pattern includes at least two lines intersecting at approximately 90 degrees.

14. The method of claim 9 wherein the machine-readable visual indicia is a MaxiCode symbol, and wherein determining if curves in the set of curves correspond to one of several selected patterns of curves includes the step of determining if the detected set of curves contains the first pattern, wherein the first pattern includes at least a partially enclosed curve.

15. A computer implemented method of analyzing an image of machine-readable visual indicia in a stored image, the stored image being represented by a plurality of pixels, and the machine-readable visual indicia having an arrangement of geometric shapes representing information, the method comprising:

sequentially identifying adjacent pixels along an edge or within a middle of a shape within the stored image;

recognizing that the shape suffers from a distortion of the shape in the stored image;

determining an orientation of the shape;

crossing the shape in a direction approximately equal to plus or minus 90 degrees from the determined orientation following recognizing that the shape suffers from a distortion, and without filling in missing adjacent pixels in this shape;

identifying an edge point of the another edge following crossing the shape; and determining if the shape corresponds to one of several selected patterns of shapes for corresponding machine-readable visual indicia types, a first selected pattern corresponding to a predetermined pattern of geometric shapes of the machine-readable visual indicia, and which does not represent widths of a plurality of shapes as measured along an intersecting sampling path.

16. The method of claim 15 wherein the image of machine-readable visual indicia is an image of a bar code symbol, and wherein crossing includes crossing a bar suffering from the distortion.

17. The method of claim 15 wherein recognizing includes identifying a second order curve fitting the sequentially identified adjacent pixels.

18. A computer implemented method of analyzing an image of a data collection symbol in a two-dimensional stored image, the two-dimensional stored image being represented by a plurality of points and the data collection symbol having a pattern of geometric shapes and spaces encoding information, the method comprising:

sequentially identifying adjacent points along an edge of or within a geometric shape in the stored image;

determining an orientation of the edge of the geometric shape;

identifying a distortion with respect to the edge or the geometric shape and jumping a selected amount in a direction approximately equal to the determined orientation, and without filling in adjacent points;

identifying a point of the edge or within the geometric shape following the jumping; and determining if the geometric shape corresponds to one of several selected patterns of shapes for corresponding data collection symbology types, a first selected pattern that corresponds to a predetermined pattern of geometric shapes for the two-dimensional stored image of the data collection symbol and which does not represent widths of a plurality of geometric shapes as measured along an intersecting sampling path.

19. The method of claim 18 wherein jumping includes;

determining an X dimension of the symbol; and jumping the selected amount, wherein the selected amount corresponds to the X dimension of the symbol multiplied by a value greater than one.

20. The method of claim 18 wherein determining includes identifying a second order curve fitting the sequentially identified adjacent pixels.

21. The method of claim 18 wherein determining includes determining that the orientation of the shape is curved, and wherein jumping includes jumping a selected arc length.

22. A computer implemented method of analyzing an image of a data collection symbol in a two-dimensional stored image, the two-dimensional stored image being represented by a plurality of points and the data collection symbol having a predetermined pattern of spaces and geometric shapes encoding information, the method comprising:

detecting a distortion in the stored image, the distortion affecting at least one of the shapes of the data collection symbol;

performing at least one distortion compensating subroutine selected from a plurality of distortion compensating subroutines, wherein at least one of the subroutines includes applying at least one morphological technique to alter the distortion;

analyzing the stored image following the applying, and producing a set of points that identify at least a portion of the shape based on the detecting, applying and analyzing; and determining if the set of points contains representations of one of several selected patterns of geometric portions for corresponding data collection symbology types, a first selected pattern corresponding to a finder pattern of geometric shapes of the data collection symbol and which does not represent widths of a plurality of shapes as measured along an intersecting sampling path.

23. The method of claim 22 wherein applying includes:

determining an orientation of the affected shape;

sampling a selected number of points through the distortion in a direction approximately equal to the determined orientation to produce a one dimensional sampled signal;

morphologically dilating the one dimensional sampled signal based on a one dimensional structuring signal; and identifying a point of the affected shape following morphologically dilating.

24. The method of claim 22 wherein applying includes:

determining an orientation of the affected shape;

sampling a selected number of points through the distortion in a direction approximately equal to the detected orientation to produce a one dimensional sampled signal;

morphologically closing the one dimensional sampled signal based on a one dimensional structuring signal; and identifying a point of the affected shape following morphologically closing.

25. The method of claim 22 wherein applying includes:

sampling a selected number of points through the distortion to produce a two dimensional sampled image;

morphologically dilating the two dimensional sampled image based on a two dimensional structuring image element; and identifying a point of the affected shape following morphologically dilating.

26. The method of claim 22 wherein applying includes:

sequentially identifying adjacent points along an edge of the affected shape within the stored image until the distortion is detected; and applying the at least one morphological technique to cross the distortion and identify an edge point on the edge following the distortion.

27. The method of claim 22 wherein detecting includes determining whether the at least one shape suffers from a complete breakage formed therethrough.

28. A computer-readable medium storing a computer implementable method for analyzing a stored image comprised of a plurality of points, the method comprising:

detecting a distortion in the stored image, wherein the stored image includes an image of a data collection symbol having a plurality of shapes and spaces encoding information, and wherein the distortion affects at least one of the shapes of the data collection symbol;

performing at least one distortion compensating subroutine selected from a plurality of distortion compensating subroutines, wherein at least one of the distortion compensating subroutines includes applying at least one morphological technique to alter the distortion; and analyzing the stored image following applying, and producing a set of points that identify at least a portion of the at least one of the shapes based on the detecting, applying and analyzing; and determining if the set of points contains representations of one of several selected patterns of geometric portions for corresponding data collection symbology types, wherein a first selected pattern corresponds to a finder pattern of geometric shapes of the data collection symbol and does not represent widths of a plurality of shapes as measured along an intersecting sampling path.

29. The computer-readable medium of claim 28 wherein applying includes:

determining an orientation of the affected shape;

sampling a selected number of points through the distortion in a direction approximately equal to the determined orientation to produce a one dimensional sampled signal;

morphologically dilating the one dimensional sampled signal based on a one dimensional structuring signal; and identifying a point of the affected shape following morphologically dilating.

30. The computer-readable medium of claim 28 wherein applying includes:

determining an orientation of the affected shape;

sampling a selected number of points through the distortion in a direction approximately equal to the detected orientation to produce a one dimensional sampled signal;

morphologically closing the one dimensional sampled signal based on a one dimensional structuring signal; and identifying a point of the affected shape following morphologically closing.

31. The computer-readable medium of claim 28 wherein applying includes:

sampling a selected number of points through the distortion to produce a two dimensional sampled image;

morphologically dilating the two dimensional sampled image based on a two dimensional structuring image element; and identifying a point of the affected shape following morphologically dilating.

32. The computer-readable medium of claim 28 wherein applying includes:

sequentially identifying adjacent points along an edge of the affected shape within the stored image until the distortion is detected; and applying the at least one morphological technique to cross the distortion and identify an edge point on the edge following the distortion.

33. The computer-readable medium of claim 28 wherein detecting includes determining whether the at least one shape suffers from a complete breakage formed therethrough.

34. An apparatus for analyzing machine-readable visual indicia, the apparatus comprising:

an image sensor that receives light reflected form the machine-readable visual indicia and that produces an image signal therefrom that represents the machine-readable visual indicia, the machine-readable visual indicia having a pattern of geometric shapes;

a storage device for storing the image signal as a plurality of points; and at least one processor, coupled to the image sensor and the storage device, that (a) detects a distortion in the stored image, the distortion affecting at least one of the shapes of the machine-readable visual indicia, (b) selects and performs at least one distortion compensating process selected from a plurality of distortion compensating processes, wherein the selected distortion compensating process applies at least one morphological technique to alter the distortion, (c) analyzes the stored image following applying at least one morphological technique, and producing a set of points that identify at least a portion of the at least one of the shapes based on the detecting, applying and analyzing; and (d) determines if the set of points contains representations of one of several selected patterns of geometric portions for corresponding machine-readable visual indicia types, a first selected pattern corresponding to a finder pattern of the machine-readable visual indicia and which does not represent widths of a plurality of shapes as measured along an intersecting sampling path.

35. The apparatus of claim 34 wherein the at least one processor sequentially identifies adjacent points along an edge of at least some of the visual indicia within the stored image signal, and wherein at least some of the curves in the set of curves are lines corresponding to detected edges of the geometric shapes.

36. The apparatus of claim 34 wherein the processor is programmed for:

determining an orientation of the affected shape;

sampling a selected number of points through the distortion in a direction approximately equal to the determined orientation to produce a one dimensional sampled signal;

morphologically dilating the one dimensional sampled signal based on a one dimensional structuring signal; and identifying a point of the affected shape following morphologically dilating.

37. The apparatus of claim 34 wherein the processor is programmed for:

determining an orientation of the affected shape;

sampling a selected number of points through the distortion in a direction approximately equal to the detected orientation to produce a one dimensional sampled signal;

morphologically closing the one dimensional sampled signal based on a one dimensional structuring signal; and identifying a point of the affected shape following morphologically closing.

38. The apparatus of claim 34 wherein the processor is programmed for:

sampling a selected number of points through the distortion to produce a two dimensional sampled image;

morphologically dilating the two dimensional sampled image based on a two dimensional structuring image element; and identifying a point of the affected shape following morphologically dilating.

39. The apparatus of claim 34 wherein the processor:

sequentially identifies adjacent points along an edge of the affected shape within the stored image until the distortion is detected; and applies the at least one morphological technique to cross the distortion and identify an edge point on the edge following the distortion.

\* \* \* \* \*